United States Patent [19]
Tsirigotis et al.

[11] Patent Number: 6,098,096
[45] Date of Patent: Aug. 1, 2000

[54] METHOD AND APPARATUS FOR DYNAMIC CACHE PRELOADING ACROSS A NETWORK

[75] Inventors: Panagiotis Tsirigotis, Mountain View; Sanjay R. Radia, Fremont, both of Calif.

[73] Assignee: Sun Microsystems, Inc., Palo Alto, Calif.

[21] Appl. No.: 08/762,705

[22] Filed: Dec. 9, 1996

[51] Int. Cl.$^7$ .................................................. G06F 15/167
[52] U.S. Cl. ..................... 709/213; 709/203; 709/216; 709/217; 709/229; 707/8; 707/10; 707/205
[58] Field of Search ........................... 395/200.3–200.33, 395/200.41–200.49, 200.57–200.59, 200; 707/8–10, 200, 1–2, 205; 709/202–203, 213–219, 227–229

[56] References Cited

U.S. PATENT DOCUMENTS

| | | | |
|---|---|---|---|
| 5,329,619 | 7/1994 | Page et al. | 709/203 |
| 5,452,447 | 9/1995 | Nelson et al. | 707/205 |
| 5,680,573 | 10/1997 | Rubin et al. | 711/129 |
| 5,701,461 | 12/1997 | Dalal et al. | 707/4 |
| 5,721,827 | 2/1998 | Logan et al. | 709/217 |
| 5,727,065 | 3/1998 | Dillon | 380/49 |
| 5,737,536 | 4/1998 | Hermann et al. | 709/229 |
| 5,802,292 | 9/1998 | Mogul | 709/203 |
| 5,940,594 | 8/1999 | Ali et al. | 709/203 |

OTHER PUBLICATIONS

Reprinted from Web Week, vol. 2, Issue 9, Jul. 8, 1996, Mecklermedia Corp., URL=http:/www.webweek.com/Jul. 8, 1996/comm/rating.html.

Azer Bestavros, "Speculative Data Dissemination and Service", Data Engineering, 1996, pp. 180–187.

Zhenig Wang, et al., "Prefetching In World Wide Web", Communications: The Key To Global Prosperity, Globecom, 1996, Global Internet 96 Conference Record, London, Nov. 18–22, 1996, vol. Supp., Nov. 18, 1996, pp. 28–32.

Bill N. Schilit, et al., "TeleWeb: Loosely Connected Access To The World Wide Web", Computer Networks and ISDN Systems, vol. 28, No. 11, May 1996, pp. 1431–1444.

James S. Gwertzman et al., "The Case For Geographical Push–Caching", Proceedings Fifth Workshop On Hot Topics in Operating Systems (HOTOS–V) (Cat. No. 95$^{th}$ 8059), Proceedings 5$^{th}$ Workshop On Hot Topics In Operating Systems (HOTOS–V), Orcas Island, WA, USA, May 4–5, 1995, pp. 51–55.

*Primary Examiner*—Zarni Maung
*Assistant Examiner*—Bharat Barot
*Attorney, Agent, or Firm*—O'Melveny & Myers LLP

[57] ABSTRACT

A caching server that provides faster access times for independently operating network elements. The caching server initiates information transfer and holds the requested information in its memory, instead of caching information transfer in response to user requests. The caching server preloads information from another server into its memory based on a set of predetermined criteria. Such preloading preferably occurs during low usage time, such as nighttime. The information source determines which information is described in the catalog in accordance with one of a second set of predetermined criteria. For example, the catalog may be organized according to size and the information source will organize the catalog by file size. The caching server preloads as many often-used files as will fit in its cache memory

20 Claims, 4 Drawing Sheets

METHOD AND APPARATUS FOR DYNAMIC CACHE PRELOADING ACROSS A NETWORK

RELATED APPLICATIONS

The following co-pending patent applications, which were filed on Dec. 9, 1996, are related to the subject application and are herein incorporated by reference:

1) U.S. application Ser. No. 08/763,234, entitled "Method and Apparatus for Client-Sensitive Name Resolution Using DNS" of Swee Boon Lim, Sanjay R. Radia, and Thomas Wong, now U.S. Pat. No. 6,014,660.
2) U.S. application Ser. No. 08/762,393, entitled "Method and Apparatus for Controlling Access to Services Within a Computers Network" of Thomas Wong, Sanjay R. Radia, Swee Boon Lim, Panagiotis Tsirigotis, and Rob Goedman, now U.S. Pat. No. 5,835,727.
3) U.S. application Ser. No. 08/762,402, entitled "Method and Apparatus for Dynamic Packet Filter Assignments" of Sanjay R. Radia, Swee Boon Lim, Panagiotis Tsirigotis, Thomas Wong, and Rob Goedman, now U.S. Pat. No. 5,848,233.
4) U.S. application Ser. No. 08/763,289, entitled "Load Balancing and Failover of Network Services" of Swee Boon Lim, Ashish Singhai, and Sanjay R. Radia, now U.S. Pat. No. 5,938,732.
5) U.S. application Ser. No. 08/763,068, entitled "Secure DHCP Server" of Swee Boon Lim, Sanjay R. Radia, Thomas Wong, Panagiotis Tsirigotis, and Rob Goedman, now U.S. Pat. No. 5,884,024.
6) U.S. application Ser. No. 08/763,212, entitled "A Method to Activate Unregistered Systems in a Distributed Multi-server Network Environment" of Thomas Wong and Sanjay R. Radia, still pending.
7) U.S. application Ser. No. 08/762,709, entitled "A Method and Apparatus for Assignment of IP Addresses" of Thomas Wong, Swee Boon Lim, Sanjay R. Radia, Panagiotis Tsirigotis, and Rob Goedman, still pending.
8) U.S. application Ser. No. 08/762,933, entitled "A Method for Using DHCP to Override Learned IP Addresses in a Network" of Sanjay R. Radia, Thomas Wong, Swee Boon Lim, Panagiotis Tsirigotis, Rob Goedman, and Mike Patrick, now U.S. Pat. No. 5,922,049.

The following co-pending patent application is related to the subject application and is herein incorporated by reference:

9) U.S. application Ser. No. 08/673,951, filed Jul. 1, 1996, entitled "A Name Service for a Redundant Array of Internet Servers" of Swee Boon Lim still pending.

FIELD OF THE INVENTION

This application relates to networking and, specifically, to a method and apparatus for caching in a network where the elements of the network are operating independently.

BACKGROUND OF THE INVENTION

Recent years have seen a huge rise in the popularity of network systems, such as the internet. A network is formed of independently operating elements that are interconnected in a way that allows them to transmit information. For example, a first network element can transmit World Wide Web pages to a second network element. The World Wide Web allows a user to use "web browser" software on his computer system to view "web pages" stored on other systems in the network. Similarly, network elements can transfer files to other network elements via File Transfer Protocol (FTP).

The amount of information transmitted over networks such as the internet has grown and will continue to grow in the future. While the overall amount of information being transferred has grown, the amount of information being transferred during a day still varies at different times of the day. A time of day when the most information is being transferred is called a "peak usage time." A time of day when a relatively small amount of information is being transferred is called a "low usage time." For example, a network that allows a consumer to download information to a personal computer using a cable modem might have a peak usage time when people get home from work and a low usage time in the middle of the night when people are asleep. It is desirable that usage of the network be evened out as much as possible. It is Iso desirable that response time be increased as much as possible.

Moreover, in conventional networks, various elements of the network have different goals. For example, in the above, mentioned consumer network, a centrally located network element may have a goal of sending as much information as possible out over the network. In contrast, a "local" computer may have a goal of giving "its" users the best response time possible.

Local computers often "cache" incoming information. For example, a web browser may save in its memory a copy of the ten most recent pages viewed by the user. That way, if the user wants to view any of the cached web pages, the browser software does not have to send a request for the web page out over the network. Instead, the browser can merely get the cached web page from its memory. The browser can access its memory much faster than it can request a web page and receive it over the network. Thus, caching saves the time otherwise required to fetch the web page from over the network. Local computers often cache the most recently accessed information so that the information will be available should the user request it again. A problem associated with conventional caching is that the user must wait for information to be downloaded into the local computer when the user makes a first request for the information. (Caching is performed in response to a user request for information). A second problem is that the information to be cached is often requested and downloaded during peak usage times.

SUMMARY OF THE INVENTION

The present invention overcomes the problems and disadvantages of the prior art by implementing a caching server that provides faster access times for independently operating network elements. Such independently operating network elements are said to have "loosely coupled administrative domains." In a preferred embodiment of the present invention, the caching server initiates information transfer and holds the requested information in its memory, instead of caching information transfer in response to user requests.

In a preferred embodiment of the present invention, the caching server preloads information from another server into its memory based on a set of predetermined criteria. For example, the caching server may download as many of the largest files as will fit in its cache memory. Such preloading preferably occurs during low usage time. Specifically, the caching server requests a "catalog" of available information from an information source, such as another server. The information source sends the catalog over the network. The caching server then decides which information it wants to preload and requests that information from the information source. Once the information is received, the caching server holds the information in a cache memory so that the information will be available when requested by a user.

Cache preloading has two main benefits: 1) it eliminates the latency time associated with accessing information requested by a user for the first time and 2) the information fetch between the information source and the caching server can take place during off-peak hours, thereby reducing the network load at peak times.

In a preferred embodiment of the present invention, the information source determines which information is described in the catalog in accordance with one of a set of predetermined criteria. For example, the catalog may be organized according to size and the information source will organize the catalog by file size. As a second example, the catalog may be organized according to the files most-often downloaded by users. In this case, the caching server will preload as many often-used files as will fit in its cache memory. As a third example, the catalog may be organized according to which files advertisers have paid to place in the catalog. In this case, the caching server will preload as many of these files as will fit in its cache memory. In accordance with the purpose of the invention, as embodied and broadly described herein, the invention is a method for quickly accessing information in a network that includes an origin system connected to a caching server, the method comprising the steps, performed by the caching server of: requesting a catalog from the origin system that lists documents available from the origin system; receiving the catalog from the origin system; requesting a document described in the catalog, the document requested according to a predetermined criterion of the caching server; receiving the document from the origin system; and storing the document in a cache memory of the caching server.

In further accordance with the purpose of this invention, as embodied and broadly described herein, the invention is a caching server having a cache memory, the caching server being part of a network that includes an origin system connected to the caching server, the caching server comprising: a first portion configured to request a catalog from the origin system that lists documents available from the origin system; a second portion configured to receive the catalog from the origin system; a third portion configured to request a document described in the catalog, the document requested according to a predetermined criterion of the caching server; a fourth portion configured to receive the document from the origin system; and a fifth portion configured to store the document in the cache memory.

Advantages of the invention will be set forth in part in the description which follows and in part will be obvious from the description or may be learned by practice of the invention. The objects and advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
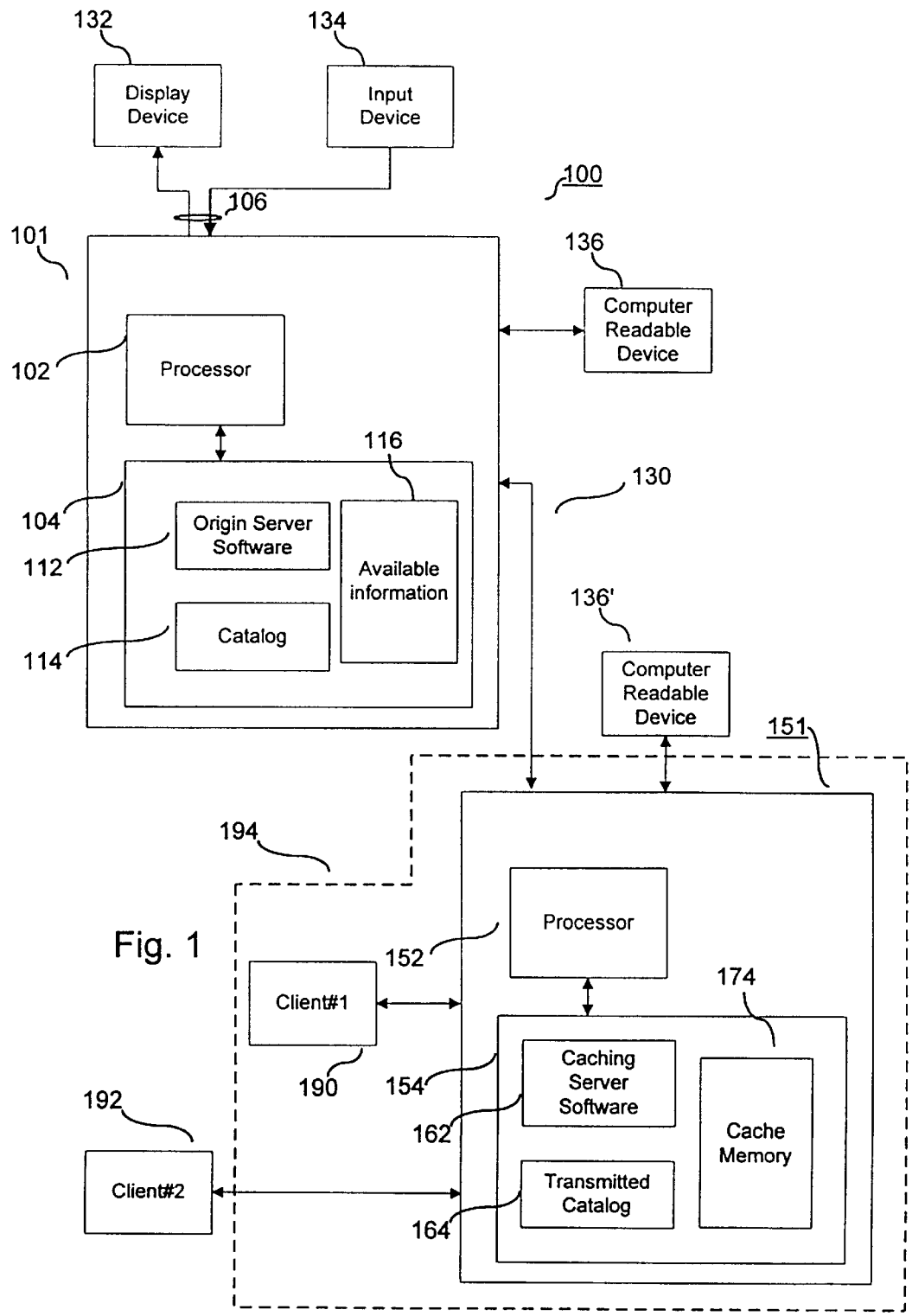
FIG. 1 is a block diagram of a data processing system in accordance with a preferred embodiment of the present invention.

FIG. 1 is a block diagram of a computer network 100 in accordance with a preferred embodiment of the present invention. Computer network 100 includes an origin computer system 101 and a caching computer system 151. Origin system 101 and caching system 151 are connected via connection 130. The computer system 100 can be any type of network, such as the internet, a LAN, a WAN, an intranet, etc., that allows systems 101 and 151 to communicate with each other. Origin system 101 and caching system 151 operate independently and communicate using any known protocol, such as Hyper Text Transfer Protocol (http). Although only two systems 101 and 151 are shown, it should be understood that additional systems can be included in computer network 100 without departing from the spirit and scope of the present invention.

Origin computer system 101 includes a processor 102 and a memory 104. Memory 104 includes origin server software 112, available information 116 and a catalog 114. Catalog 114 contains, for example, a description of information available from origin system 101. System 101 preferably connects to a display device 132, a computer readable device 136 and an input device 134, which can be any of a wide range of varying I/O devices, such as disk drives, keyboards, modems, network adapters, printers, and displays. Respective computer readable devices 136, such as a disk drive or CD ROM drive, are shown connected to origin system 101 and caching system 151. Origin server software 112 and Caching server software 162 are preferably loaded into memory via devices 136.

Caching computer system 151 includes a processor 152 and a memory 154. Memory 154 includes caching server software 162 and a catalog 164 transmitted from origin system 101. FIG. 1 also shows a cache memory 174. Cache memory 174 may be a part of memory 104 (as shown) or may be a separate memory. Cache memory 174 has a predetermined maximum size. In the described embodiment, caching system 151 is connected to client#1 190 and client#2 192. In the described embodiment, client#1 190 and caching system 151 jointly form a caching server 194. In other embodiments, client#1 may be located in either the same or a different computer as caching system 151. In still other preferred embodiments, caching system 151 performs the functions of client#1 190. Client#2 may be located in either the same or a different computer as caching system 151.

The present invention allows preloading of caching system 151 from origin system 101, where the priorities of the entities administrating the systems 101 and are 151 different. For example, the origin system 101 will want to "push out" as much information as possible, while the caching system 151 is willing only to cache a certain amount of information. Origin system 101 may be, for example, a large, centrally located server that stores a large number of http documents, such as web pages and files. Caching system 151 may be, for example, a regional server accessible by clients in a geographical region. A typical network may include multiple origin systems 101 and/or multiple caching systems 151.

Figure 2:
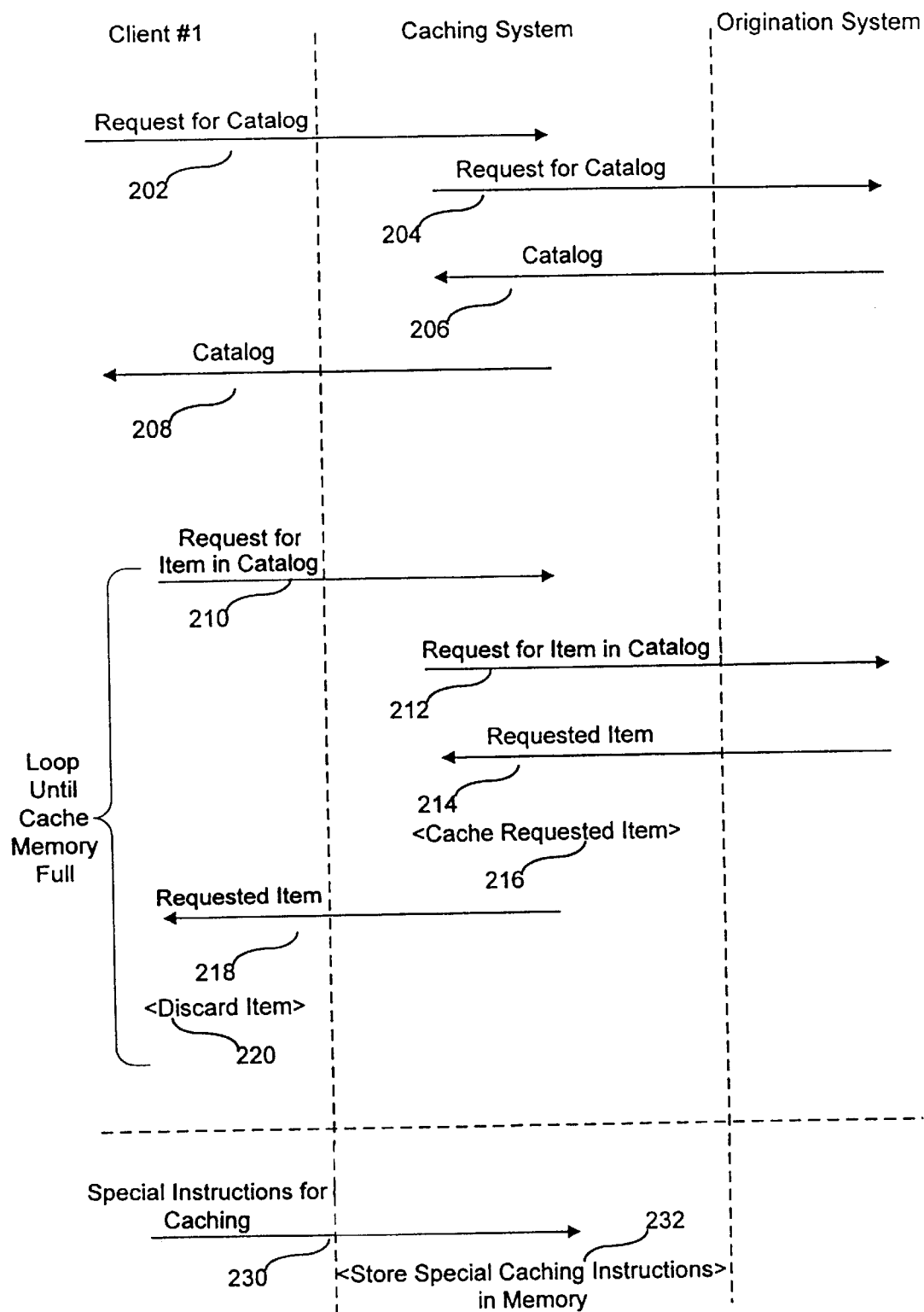
FIG. 2 is a diagram showing steps of a method for preloading a caching server.

FIG. 2 is a diagram showing steps of a method for preloading caching system 151 in accordance with a preferred embodiment of the present invention. The figure is divided into three areas, representing, respectively, Client#1 190, caching system 151 and origin system 101. In the described embodiment, the client and the servers communicate with one another via the http protocol, although other suitable protocols could be used. Processor 152 executes caching server software 162 to perform the steps of the middle column. Processor 102 executes origin server software 112 to perform the steps of the right-most column. Client#1 190 and client#2 192 preferably contain a processor executing software performing the illustrated steps. As discussed above, FIG. 1 shows client#1 190 as a separate process, which may or may not run on a separate machine. In an alternate embodiment, the functions of client#1 190 are performed by caching server software 162.

In step 202, client#1 190 initiates a request for a catalog to caching system 151. In the described embodiment, client#1 190 sends such a request at a predetermined time, such as in the middle of the night. It is desirable that the request of step 202 be performed at a time when the network is not busy. Such timing helps to reduce network load at peak times. In step 204, caching system 151 sends a request for a catalog to origin system 101. In step 206, origin system 101 sends the catalog 114 to caching system 151. In step 208, caching system 151 sends the catalog to client#1 190.

Steps 210 through 220 are performed multiple times until client#1 190 determines that cache memory 174 is full (or that some maximum amount of cache space is filled). Alternately, client#1 190 may send a list of information to preload to caching system 151 and caching system 151 will load as many of the items on the list as will fit in cache memory 174. In step 210, client#1 190 requests an item in the catalog from caching system 151. In step 212, caching system 151 sends the request to origin system 101, which in step 214 returns the requested item. In step 216, caching system 151 caches the returned item in cache memory 174. FIG. 2 shows in step 218 that the item is then forwarded to client#1 190, which in step 220 discards it, but may keep information about the item, such as the size. Alternately, caching system151 may simply cache the item without sending it to client#1 190. Thus, at the end of step 216, information has been preloaded into caching system 151 and is awaiting user requests for the information.

FIG. 2 also shows a step 230 in which client#1 190 sends special instructions to caching system 151. These special instructions may, for example, specify that certain information in cache memory 174 should not be discarded from cache memory for a predetermined amount of time. As another example, the special instruction may instruct caching system 151 to immediately discard certain information in cache memory 174. The information may be specified, for example, by its URL (Uniform Resource Locator). Alternately, the special instruction may instruct the caching system 151 to delete (or save) information in a last-in, first-out order or in some other appropriate order. In step 232 caching system 151 stores special caching instructions in memory 154.

Figure 3:
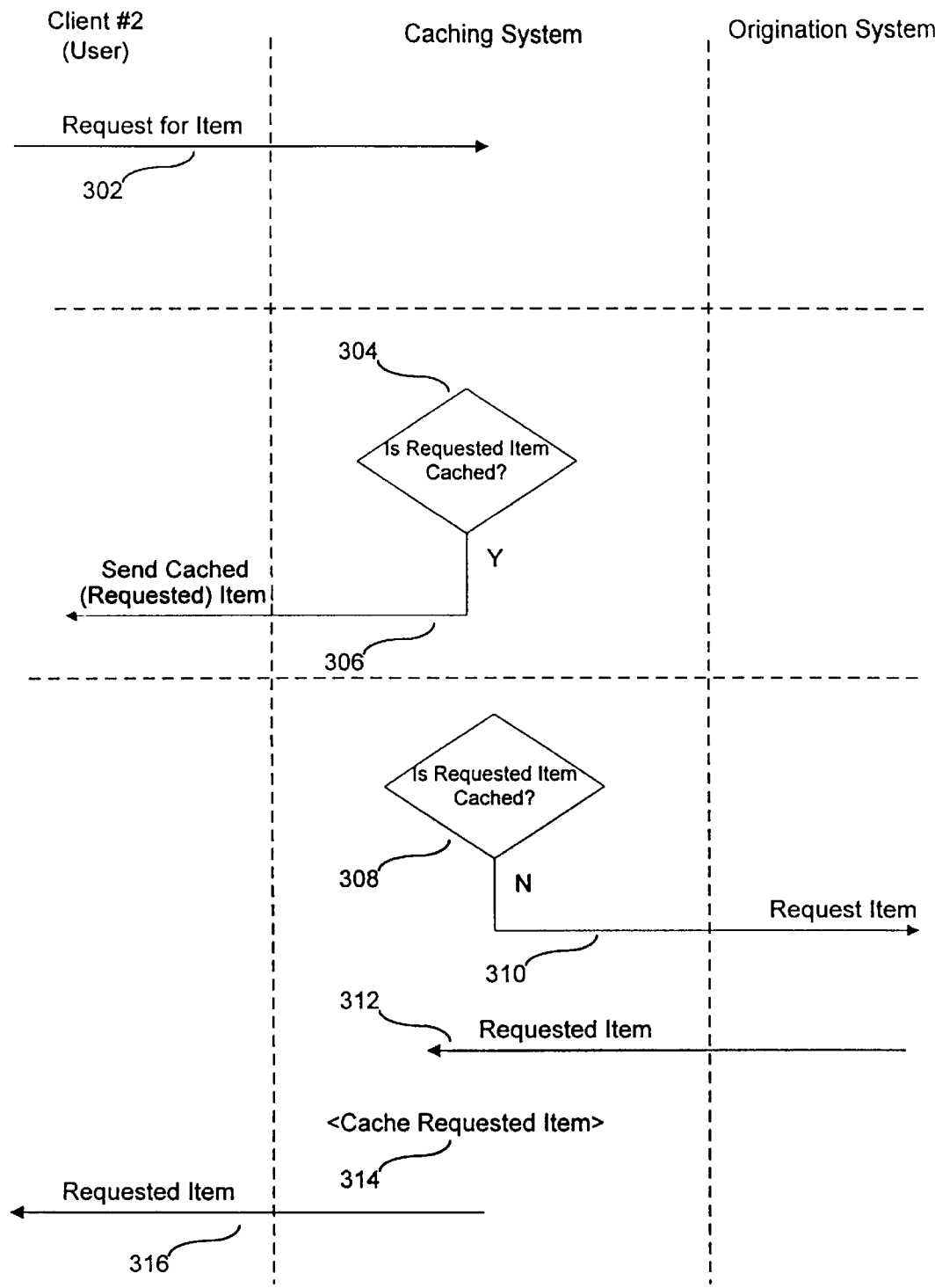
FIG. 3 is a diagram showing steps of a method for fulfilling a user's request for information.

FIG. 3 is a diagram showing steps of a method for fulfilling a user's request for information. The steps of FIG. 3 are performed after the caching system 151 has preloaded some information into cache memory 174, as shown in FIG. 2. In the example, the user is logged onto client#2 192. In step 302, the user requests information such as a file or a web page by URL. If, in step 304, the requested information has been preloaded and exists in cache memory 174, the information is copied from cache memory 174 and in step 306 sent to client#2 192. If, in step 308, the information was not preloaded, then, in step 310, caching system 151 requests the information from origin system 101, which in step 312 returns the requested information. In step 314, caching system 151 stores the information in cache memory 174 and, in step 316, sends the information to the requesting client. Caching system 151 determines whether certain information is present in cache memory 174 via any of a variety of known cache memory techniques.

Note that step 314 may involve purging (discarding) items from cache 174 to make room for new items. If caching system 151 has received special instructions not to discard certain cached information, then in step 314, that information will not be discarded from cache, even if it would normally be next in line to be discarded.

Figure 4A:
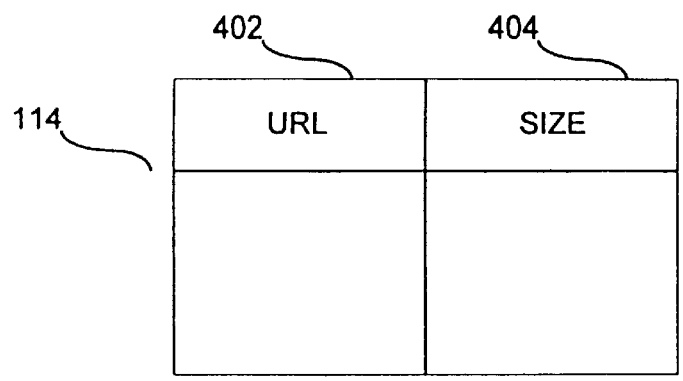
FIGS. 4a through 4c show examples of possible catalog formats.
Figure 4B:
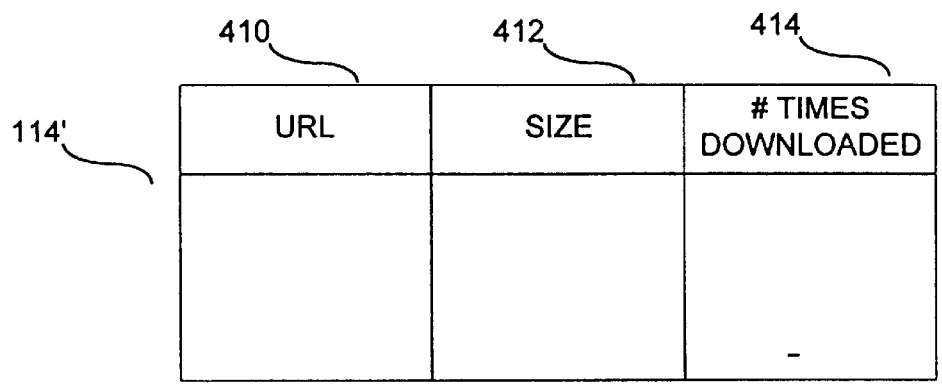
Figure 4C:
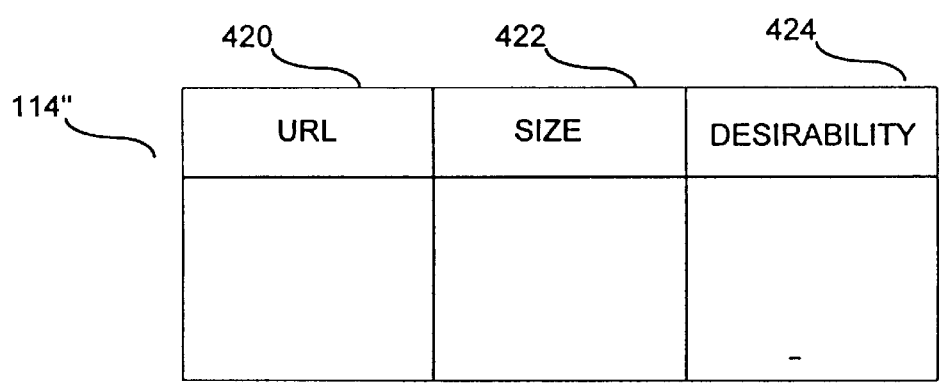

FIGS. 4a through 4c show respective examples of formats of catalog 114. Each example format includes a section or row in the catalog for each file or URL that is available to be downloaded from the origin system. These formats are provided by way of example only and are not meant to limit the scope of the present invention. Catalog 114 is preferably an http document of type "text/plain." FIG. 4a shows a format in which catalog 114 includes two fields: a Uniform Resource Locator (URL) field 402 and a size field 404. The catalog may optionally be organized by increasing or decreasing size.

FIG. 4b shows a format in which catalog 114 includes three fields: a URL field 410, a size field 412, and a "# of times downloaded" field 414 (also called a "popularity" field). Alternately, the popularity field 414 could be omitted and the catalog could simply be sorted by ascending or descending popularity value.

FIG. 4c shows a format in which the catalog includes three fields: a URL field 420, a size field 422, and a "the desirability field 424." Alternately, the desirability field 412 could be omitted and the catalog could simply be sorted by ascending or descending desirability. In this example, desirability indicates a criteria defined in origin system 101. For example, if an advertiser had paid a premium to have his information placed into the catalog, the information would have a high desirability value in the catalog. Other examples of catalogs might have the URLs sorted according to their PICS rating, or any similar rating which rates the content of files.

Caching system 151 reviews the contents of catalog 114 and determines which available information described in catalog 114 it should preload. This determination is made in accordance with a number of criteria stored in the memory of caching system 151. A simple criteria, for example, is to simply preload files in the catalog by size, largest first, until cache memory 174 is full (or a predetermined cache size limit has been reached). Another possible criteria might be that caching system 151 preloads according to both the size of the file, the available cache space, and the "popularity" or "desirability" of the file. Another possible criteria might be that the caching system 151 preloads in accordance with one of the criteria described above, but does not, under any circumstances, download information on a "do not download" list stored in its memory. For example, certain caching systems 151 might never want to download adult material or material from a predetermined information source. As can be seen from the above examples, the criteria used to determine what information to download is affected somewhat by what information is available in catalog 114. A large number of catalog formats and caching system criteria are compatible with the present invention.

In some embodiments, origin system 101 gives "hints" to the caching system/client as to when it should next request a catalog. Theses hints may be sent as part of the catalog or may be sent in a separate administrative message. For example, if the catalog is normally updated every twenty-four hours, origin system 101 might suggest that the catalog be downloaded by the caching system every twenty-four hours. If, however, some important event is occurring, origin system 101 might suggest that the catalog be downloaded more frequently because it is being updated more frequently by origin system 101.

In a preferred embodiment, if origin system 101 is accessed by multiple caching servers, a different catalog can be sent to each caching server 194. The catalog is dynamically generated based on, for example, the access pattern generated by the particular caching server as observed by the origin system. Alternately, catalogs are determined by policy decisions at the origin system 101. For example, the catalogs sent to a certain caching server may not contain adult material.

In summary, the present invention allows a caching server preferably including a client and a caching system, to initiate a request for a catalog of available http documents. This request is made at night or during a slow time on the network. After the catalog is received, the caching server decides which of the documents in the catalog to prelo preloaded documents should not be purged from its cache for a predetermined time.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for quickly accessing information in a network that includes an origin system and a user computer, each connected to a caching server, the method comprising the steps, performed by the caching server of:

requesting a catalog from the origin system that lists documents available to be downloaded from the origin system, the documents selected by the origin system according to a first predetermined criterion of the caching server;

receiving the catalog from the origin system;

selecting a document from the catalog according to a second predetermined criterion of the caching server:

requesting the selected document described in the catalog from the origin system;

receiving the selected document from the origin system; and storing the selected document in a cache memory of the caching server, thereby making the selected document available to the user computer through the caching server before a request for the selected document is received from the user computer.

2. The method of claim 1, wherein the user computer is connected to the caching server through the network, the method further including the steps performed by the caching server of:

receiving, by the caching server, a request for the selected document from the user computer; and sending, from the caching server over the network, the selected document stored in the cache memory to the user computer.

3. The method of claim 2, further including the steps performed by the caching server of:

determining a portion of the cache memory to be used for storing preloaded documents; and repeating the steps of selecting a document, requesting the selected document, receiving the selected document and storing the selected document until the determined portion of the cache memory is full of preloaded documents that meet the second predetermined criterion, or until no further documents in the catalog meet the second predetermined criterion.

4. The method of claim 3, further including the steps of:

receiving from the user computer a request for a new document that has not been preloaded into the cache memory of the caching server;

requesting the new document from the origin system;

receiving via the network the new document from the origin system; and sending via the network the new document to the user computer.

5. The method of claim 4, further including the steps of:

storing the new document in the cache memory;

wherein non-preloaded documents stored in the cache memory are purged to free cache memory space when the cache memory is full to make storage space available for the new document.

6. The method of claim 5, further including the step, between the steps of receiving the catalog from the origin system and selecting a document, of purging preloaded documents stored in the determined portion of the cache memory to make storage space available for the selected document.

7. The method of claim 1, wherein the step of requesting a catalog from the origin system performed during a low usage time of the network.

8. The method of claim 1, wherein the caching server includes a client and a caching system and wherein the step of requesting a catalog from the origin system includes the steps of:

sending the request for the catalog from the client to the caching system; and sending the request for the catalog from the caching system to the origin system.

9. The method of claim 1, wherein the caching server includes a client and a caching system and wherein the step of requesting a document described in the catalog includes the steps of:

sending the request for selected document from the client to the caching system; and sending the request for selected document from the caching system to the origin system.

10. The method of claim 1, wherein the second predetermined criterion used by the caching server to determine whether to request a document from the catalog is based on the size of the document.

11. The method of claim 1, wherein the second predetermined criterion used by the caching server to determine whether to request a document from the catalog is based on a rating associated with the document and stored in the catalog.

12. The method of claim 1, wherein the second predetermined criterion used by the caching server to determine whether to request a document from the catalog is based on a list of non-acceptable document names.

13. The method of claim 1, wherein the network includes a second caching server and the first and second caching servers receive different catalogs from the origin system.

14. The method of claim 1, wherein the network includes a second caching server and the first and the second caching servers request different documents from the origin system.

15. The method of claim 1, wherein the origin system and the caching server use http protocol to communicate.

16. The method of claim 1, wherein the caching server includes a client and a caching system and further including the steps of:

sending, by the client to the caching system, an instruction to retain the document in the cache memory for a specified amount of time; and retaining the document in the cache memory, by the caching system, for the specified amount of time.

17. The method of claim 1, wherein the caching server includes a client and a caching system and further including the steps of:

sending, by the client to the caching system, an instruction to purge the document from the cache memory; and purging the document from the cache memory, by the caching system.

18. A caching server having a cache memory, the caching server being part of a network that includes an origin system and at least one user computer connected to the caching server through the network, the caching server comprising:

a first portion configured to request a catalog from the origin system that lists documents available to be downloaded from the origin system, the documents selected by the origin system according to a first predetermined criterion of the caching server;

a second portion configured to receive the catalog from the origin system;

a third portion configured to select a document from the catalog according to a second predetermined criterion of the caching server;

a fourth portion configured to request the selected document described in the catalog from the origin system;

a fifth portion configured to receive the selected document from the origin system;

a sixth portion configured to store the selected document in the cache memory;

a seventh portion configured to receive a request for the selected document from the at least one user computer; and a eighth portion configured to send the requested document stored in the cache memory to the at least one user computer.

19. The caching server of claim 18, wherein the caching server includes a client and a caching system and wherein the first portion includes:

a ninth portion configured to send the request for the catalog from the client to the caching system; and a tenth portion configured to send the request for the catalog from the caching system to the origin system.

20. A computer program product comprising:

a computer usable medium having computer readable code embodied therein for causing access to information stored on a network having a origin system, a caching server, and at least one user computer, the computer program product comprising:

computer readable program code devices configured to cause a computer to effect requesting a catalog from the origin system that lists documents available to be downloaded from the origin system, the documents selected according to a first predetermined criterion of the caching server;

computer readable program code devices configured to cause a computer to effect receiving the catalog from the origin system;

computer readable program code devices configured to cause a computer to effect selecting a document from the catalog according to a second predetermined criterion of the caching server;

computer readable program code devices configured to cause a computer to effect requesting the selected document described in the catalog from the origin system;

computer readable program code devices configured to cause a computer to effect receiving the selected document from the origin system;

computer readable program code devices configured to cause a computer to effect storing the selected document in the cache memory;

computer readable program code devices configured to cause a computer to effect receiving a request for the selected document from the at least one user computer; and computer readable program code devices configured to cause a computer to effect sending the requested document stored in the cache memory to the user computer.

* * * * *